(12) United States Patent
Chang et al.

(10) Patent No.: US 12,023,565 B2
(45) Date of Patent: Jul. 2, 2024

(54) PROJECTION SYSTEM AND PROJECTION CALIBRATION METHOD USING THE SAME

(71) Applicant: INDUSTRIAL TECHNOLOGY RESEARCH INSTITUTE, Hsinchu (TW)

(72) Inventors: Chung-Wei Chang, Taipei (TW); Yi-Ling Lee, Taichung (TW); Peng-Yu Chen, Toufen (TW); Fang-Ming Lee, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 37 days.

(21) Appl. No.: 17/540,877

(22) Filed: Dec. 2, 2021

(65) Prior Publication Data
US 2023/0072172 A1  Mar. 9, 2023

(30) Foreign Application Priority Data
Aug. 26, 2021 (TW) .................................. 110131655

(51) Int. Cl.
*A63B 69/40* (2006.01)
*A63B 69/00* (2006.01)
*A63B 102/18* (2015.01)

(52) U.S. Cl.
CPC .......... *A63B 69/40* (2013.01); *A63B 69/0002* (2013.01); *A63B 2069/0008* (2013.01);
(Continued)

(58) Field of Classification Search
CPC . F41G 3/165; A63B 2225/02; A63B 2225/20; A63B 69/40; A63B 2102/18; A63B 69/0002; A63B 2069/0008
See application file for complete search history.

(56) References Cited

U.S. PATENT DOCUMENTS 4,137,651 A * 2/1979 Pardes .................. F41G 3/2627
434/22
4,619,616 A * 10/1986 Clarke .................. F41G 3/2638
434/22
(Continued)

FOREIGN PATENT DOCUMENTS

CN     102564232 A    7/2012
CN     105549603 A    5/2016
(Continued)

OTHER PUBLICATIONS

Baskin et al., "Robust control for line-of-sight stabilization of a two-axis gimbal system", Turkish Journal of Electrical Engineering & Computer Sciences (2017) 25: pp. 3839-3853.
(Continued)

*Primary Examiner* — Octavia Davis Hollington
(74) *Attorney, Agent, or Firm* — Birch, Stewart, Kolasch & Birch, LLP

(57) ABSTRACT

A projection system includes a control module, a projection tube, an aiming driver, an observation device and an observation driver. The control module is configured to issue a first control command and a second control command. The aiming driver is electrically connected to the projection tube and configured to control, in response to the first control command, a projection viewing-line of the projection tube to be aligned with a calibration point. The observation driver is electrically connected to the observation device and configured to control, in response to the second control command, an observation viewing-line of the observation device to be aligned with the calibration point. The projection tube and the observation device are controlled asynchronously.

8 Claims, 12 Drawing Sheets

(52) U.S. Cl.
CPC ....... *A63B 2102/18* (2015.10); *A63B 2225/02* (2013.01); *A63B 2225/20* (2013.01)

(56) References Cited

U.S. PATENT DOCUMENTS

| | | | |
|---|---|---|---|
| 7,496,241 B1 * | 2/2009 | Reneker | G01C 11/02 |
| | | | 382/274 |
| 8,543,525 B2 * | 9/2013 | Distante | G06V 10/24 |
| | | | 382/156 |
| 9,056,396 B1 | 6/2015 | Linnell | |
| 9,151,573 B2 | 10/2015 | Isola et al. | |
| 9,661,257 B2 * | 5/2017 | Ishikawa | G03B 21/147 |
| 9,870,622 B1 | 1/2018 | Lu et al. | |
| 10,095,942 B2 | 10/2018 | Mentese et al. | |
| 10,585,993 B2 | 3/2020 | O'Connor et al. | |
| 10,795,336 B2 | 10/2020 | Kim et al. | |
| 11,341,604 B2 | 5/2022 | Arai | |
| 2012/0033855 A1 | 2/2012 | Ryan | |
| 2017/0138710 A1 * | 5/2017 | Sullivan | F41G 3/165 |
| 2018/0353822 A1 | 12/2018 | Joo et al. | |
| 2019/0022487 A1 | 1/2019 | Joo et al. | |
| 2019/0201794 A1 | 7/2019 | Kang | |
| 2021/0266437 A1 | 8/2021 | Wexler et al. | |
| 2021/0383129 A1 | 12/2021 | Rosenberg | |
| 2022/0067408 A1 | 3/2022 | Sheu et al. | |
| 2023/0072172 A1 | 3/2023 | Chang et al. | |
| 2023/0140441 A1 * | 5/2023 | Koivuharju | F41G 3/02 |
| | | | 235/404 |
| 2023/0285832 A1 | 9/2023 | Masiukiewicz et al. | |
| 2023/0372803 A1 | 11/2023 | Kweon et al. | |

FOREIGN PATENT DOCUMENTS

| | | | |
|---|---|---|---|
| CN | 108401133 A | | 8/2018 |
| CN | 109822692 A | | 5/2019 |
| CN | 107148639 B | | 7/2019 |
| CN | 110402406 A | | 11/2019 |
| CN | 111256537 A | * | 6/2020 ............... F41G 11/00 |
| CN | 210666449 U | | 6/2020 |
| CN | 111381612 A | | 7/2020 |
| CN | 112543858 A | | 3/2021 |
| CN | 113439727 A | | 9/2021 |
| CN | 215067868 U | | 12/2021 |
| DE | 3703436 A1 | * | 8/1988 |
| DE | 4035023 A1 | * | 5/1992 |
| JP | H09304055 | * | 11/1997 |
| KR | 101578028 B1 | * | 12/2015 |
| TW | 201021187 A1 | | 6/2010 |
| TW | M431003 U1 | | 6/2012 |
| TW | 201331733 A1 | | 8/2013 |
| TW | I490097 B | | 7/2015 |
| TW | I509568 B | | 11/2015 |
| TW | I553592 B | | 10/2016 |
| TW | M541010 U | | 5/2017 |
| TW | 201819951 A | | 6/2018 |
| TW | 201902605 A | | 1/2019 |
| TW | I674402 B | | 10/2019 |
| TW | I685798 B | | 2/2020 |
| TW | I706291 B | | 10/2020 |
| TW | 202101291 A | | 1/2021 |
| TW | M620697 U | | 12/2021 |
| TW | 202215367 A | | 4/2022 |
| TW | 202230201 A | | 8/2022 |
| WO | WO 2020/061918 A1 | | 4/2020 |

OTHER PUBLICATIONS

Mirdanies et al., "Object Recognition System in Remote Controlled Weapon Station Using Sift and Surf Methods", Mechatronics, Electrical Power, and Vehicular Technology 04 (2013), pp. 99-108.

Telen et al., "Design Study of Gyro-stabilized, Remote-controlled Weapon Station", Mindanao Journal of Science and Technology, vol. 15, (2017), pp. 103-112.

Taiwanese Notice of Allowance and Search Report dated May 18, 2022 for Application No. 110131655.

Brown et al., "Recognising Panoramas," Department of Computer Science, University of British Columbia, 2003, 8 pages total.

Dolasiński, "Remote Controlled Weapon Stations—Development of Thought and Technology," 12th International Conference on Scientific Aspects of Armament & Safety Technology, 2018, pp. 87-100.

Erwin et al., "Motor Driver Program On Heavy Machine Gun Model For Remote Controlled Weapon Station (RCWS)," International Conference on ICT for Smart Society, IEEE, 2013, 6 pages total.

Liu, "Categorization and legality of autonomous and remote weapons systems," International Review of the Red Cross, vol. 94, No. 886, 2012, pp. 627-652.

Taiwanese Office Action and Search Report for Taiwanese Application No. 111140408, dated Sep. 15, 2023.

U.S. Notice of Allowance for U.S. Appl. No. 18/089,102, dated Apr. 16, 2024.

* cited by examiner

PROJECTION SYSTEM AND PROJECTION CALIBRATION METHOD USING THE SAME

This application claims the benefit of Taiwan application Serial No. 110131655, filed Aug. 26, 2021, the subject matter of which is incorporated herein by reference.

TECHNICAL FIELD

The disclosure relates in general to a projection system and projection calibration method using the same.

BACKGROUND

A projection system could project a projected object toward a target point. In order to increase the accuracy and precision of hitting the target point; however, the projection system is affected by its own tolerances (for example, component manufacturing tolerances, component assembly work tolerances) and environmental factors (for example, wind direction, wind speed, etc.), and thus the projected object is usually biased with the target point. Therefore, proposing a projection system that could improve the aforementioned conventional deviation problem is one of the goals of the industry in this technical field.

SUMMARY

According to an embodiment, a projection calibration method is provided. The projection calibration method includes the following steps: in response to a first control command, controlling, by an aiming driver, a projection viewing-line of a projection tube to be aligned with a calibration point; in response to a second control command, controlling, by an observation driver, an observation viewing-line of an observation device to be aligned with the calibration point. Wherein step of controlling the projection viewing-line of the projection tube to be aligned with the calibration point and step of controlling the observation viewing-line of the observation device to be aligned with the calibration point are performed asynchronously.

According to another embodiment, a projection system is provided. The projection system includes a control module, a projection tube, an aiming driver, an observation device and an observation driver. The control module is configured to issue a first control command and a second control command. The aiming driver is electrically connected to the projection tube and configured to control, in response to the first control command, a projection viewing-line of the projection tube to be aligned with a calibration point. The observation driver is electrically connected to the observation device and configured to control, in response to the second control command, an observation viewing-line of the observation device to be aligned with the calibration point. Wherein the projection tube and the observation device are controlled asynchronously.

The above and other aspects of the disclosure will become better understood with regard to the following detailed description of the preferred but non-limiting embodiment(s). The following description is made with reference to the accompanying drawings.

Figure 1A:
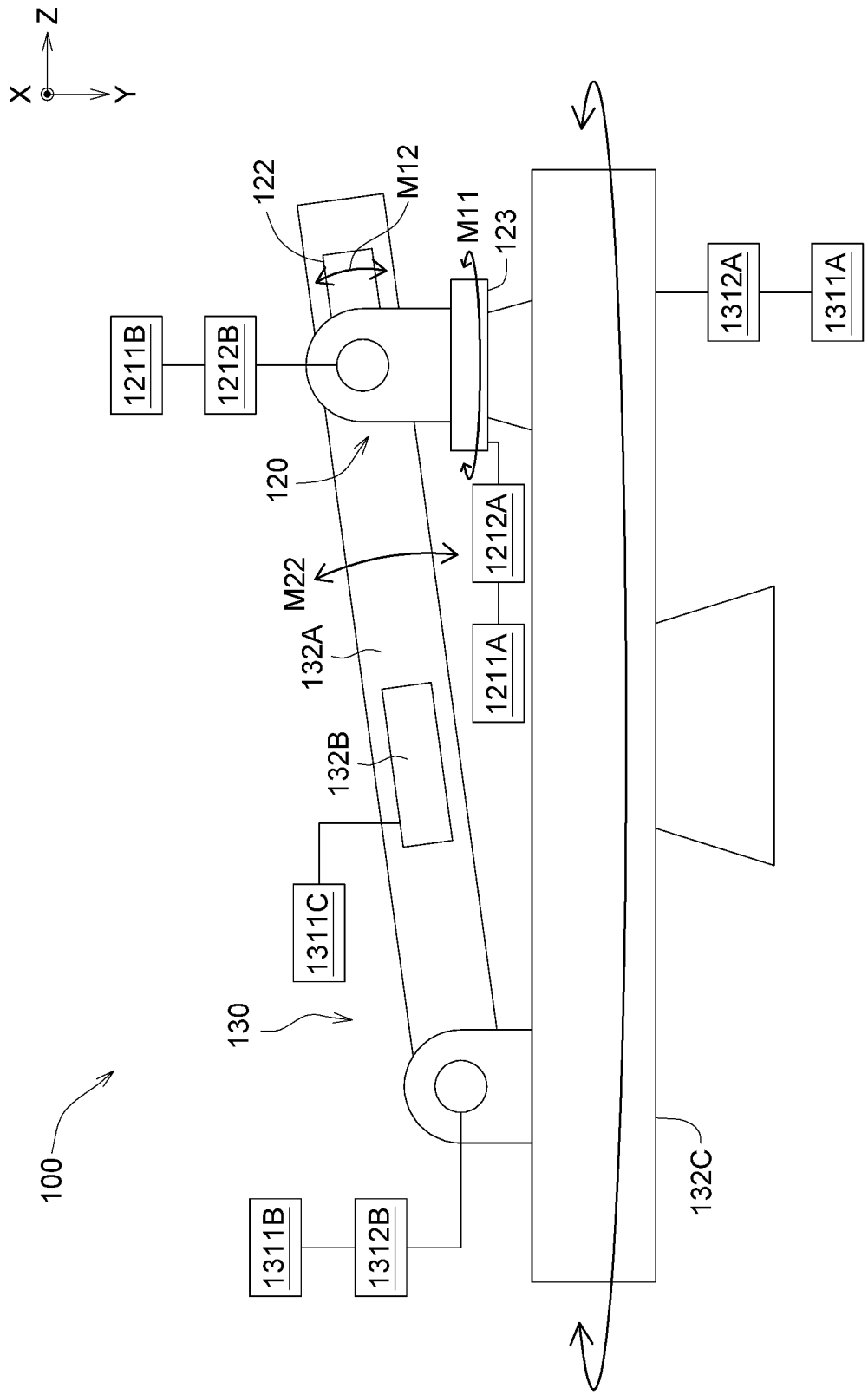
FIG. 1A shows a schematic view of a projection system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
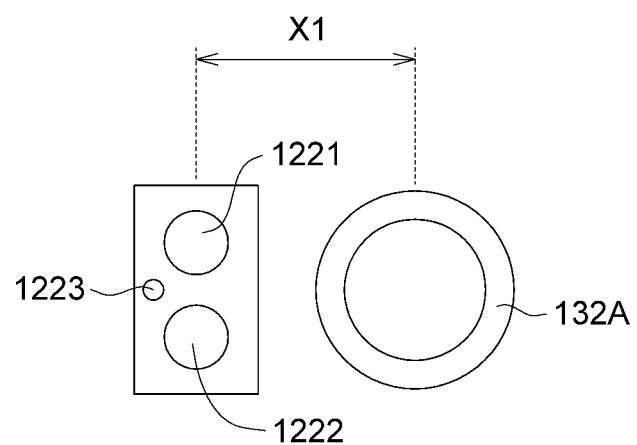
FIG. 1B shows a front view of an observation device of FIG. 1A.
Figure 2:
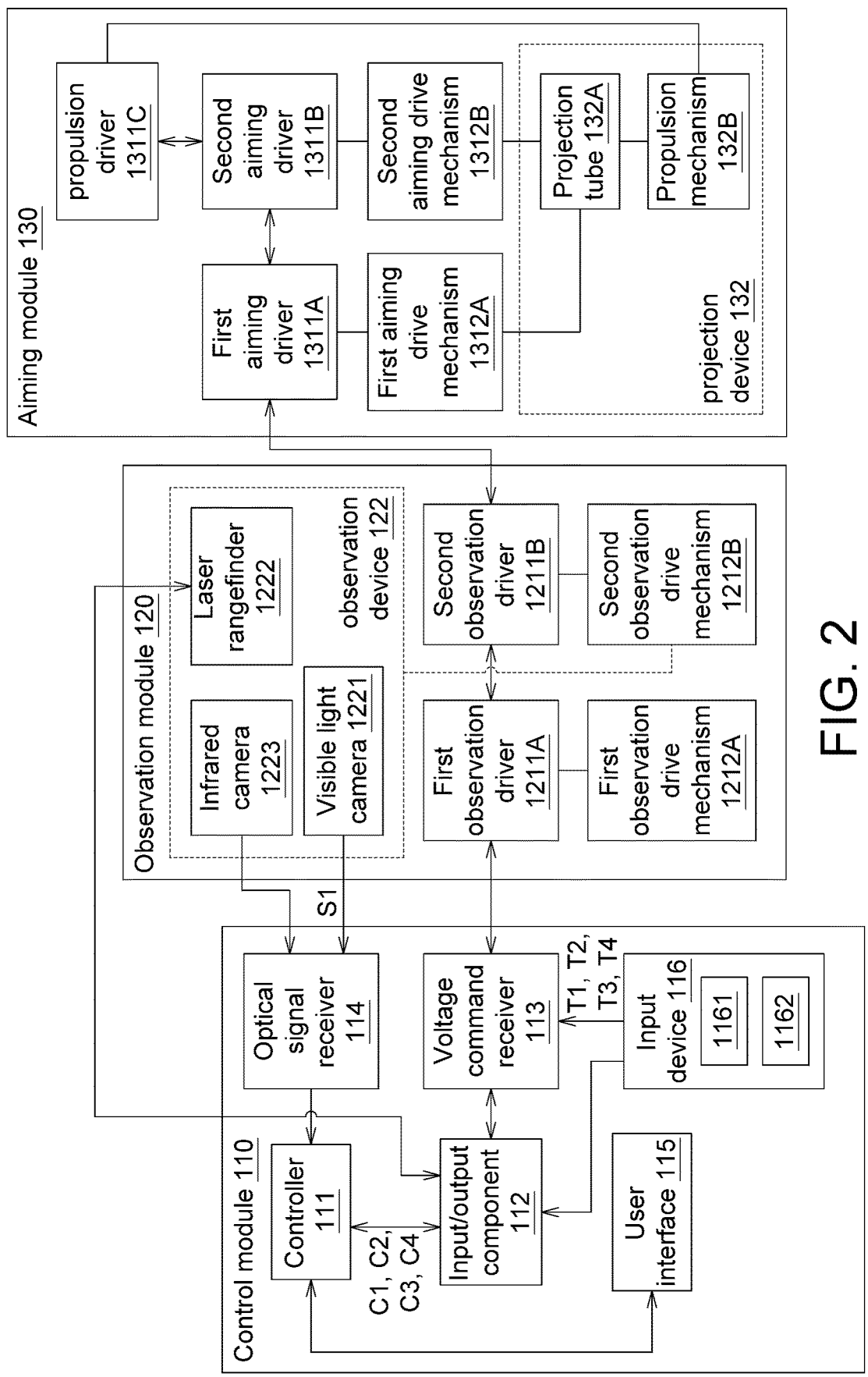
FIG. 2 shows a functional block diagram of the projection system of FIG. 1A.
Figure 3A:
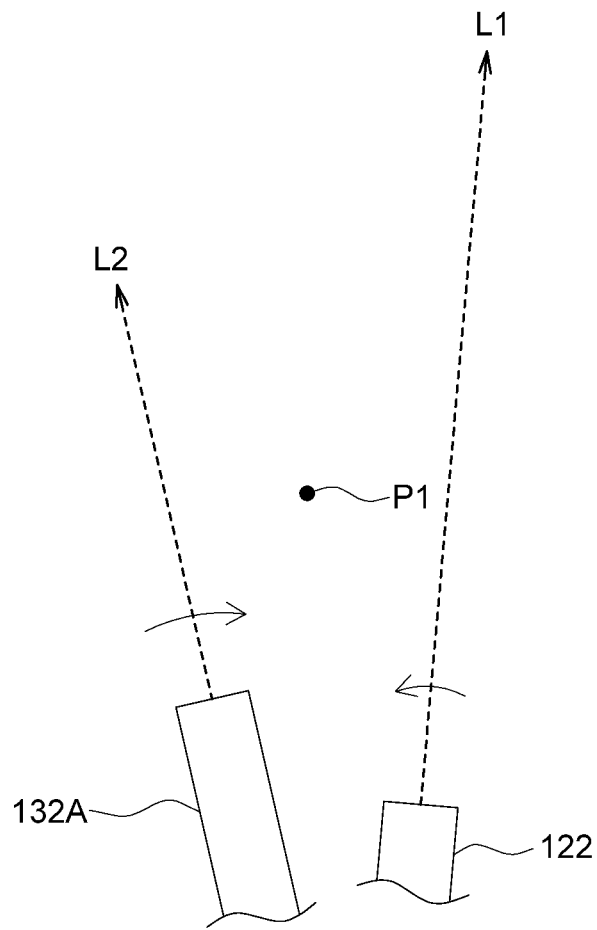
FIG. 3A shows a schematic view of an observation viewing-line of the observation device of FIG. 1A and a projection viewing-line of a projection tube.
Figure 3B:
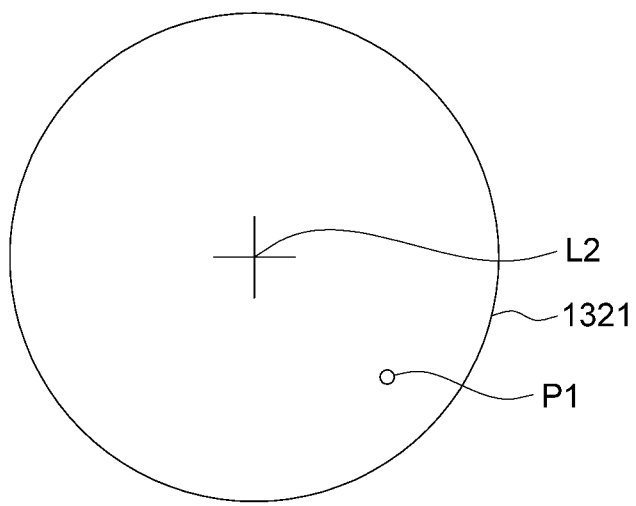
FIG. 3B shows a schematic view of the field of view seen/viewed from the calibration mirror of the projection tube of FIG. 1A.
Figure 3C:
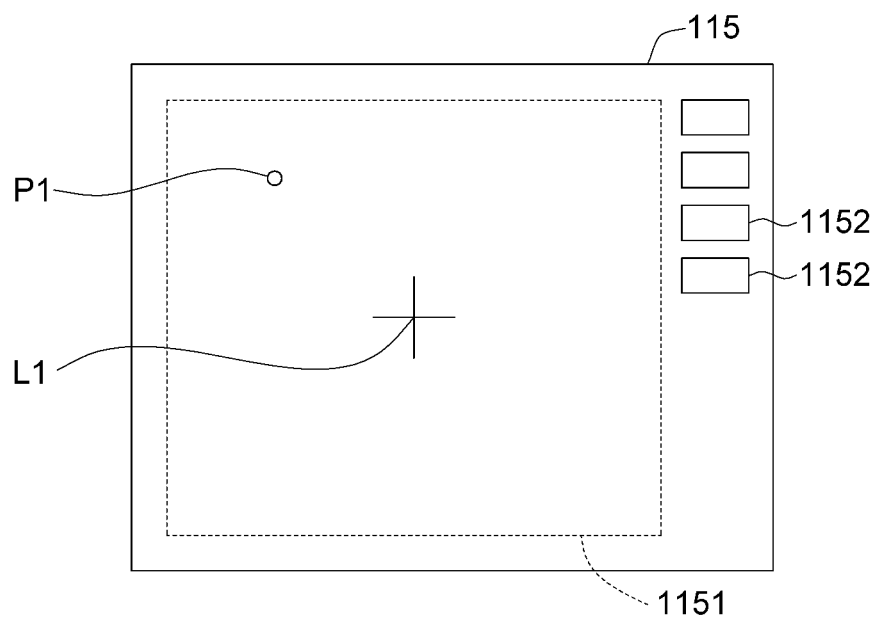
FIG. 3C shows a schematic view of an observation frame displayed on a display area of an user interface of FIG. 1A.
Figure 4A:
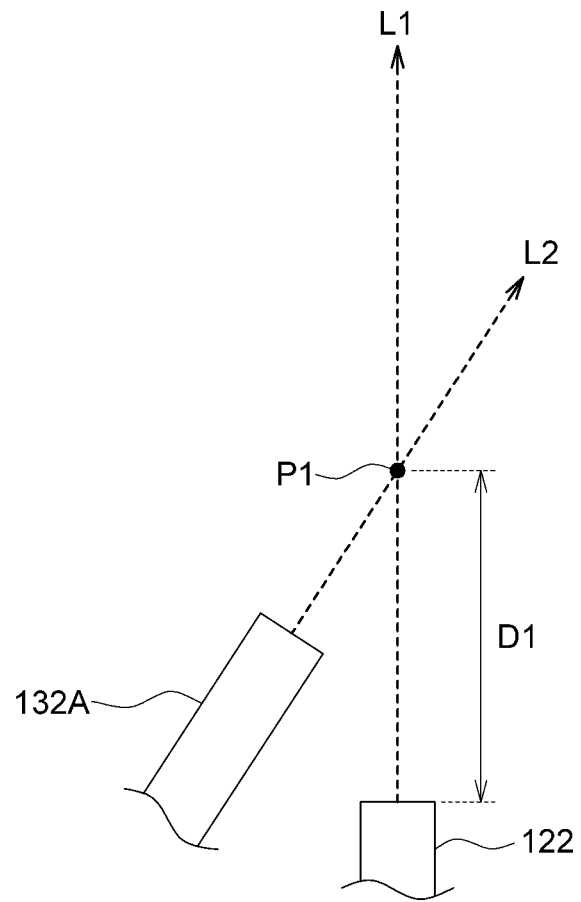
FIG. 4A shows a schematic view of the observation viewing-line of the observation device and the projection viewing-line of the projection tube of FIG. 3A intersecting at a calibration point.
Figure 4B:
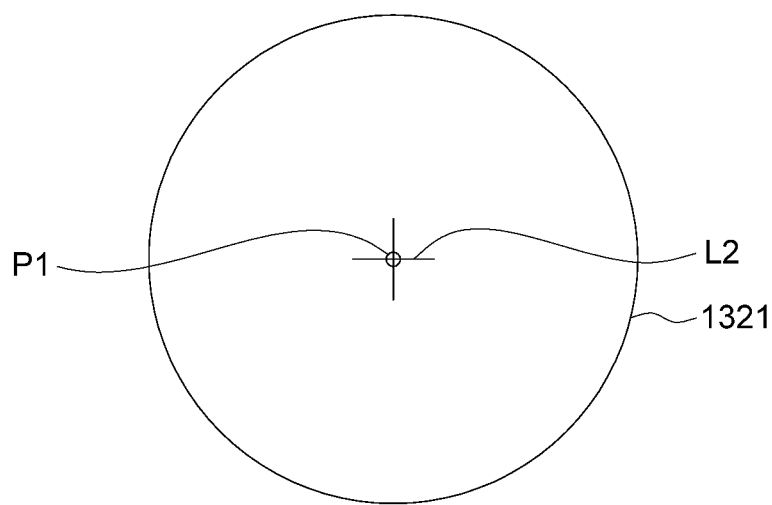
FIG. 4B shows a schematic view of the field of view seen/viewed from the calibration mirror of the projection tube of FIG. 3B overlaps with the calibration point.
Figure 4C:
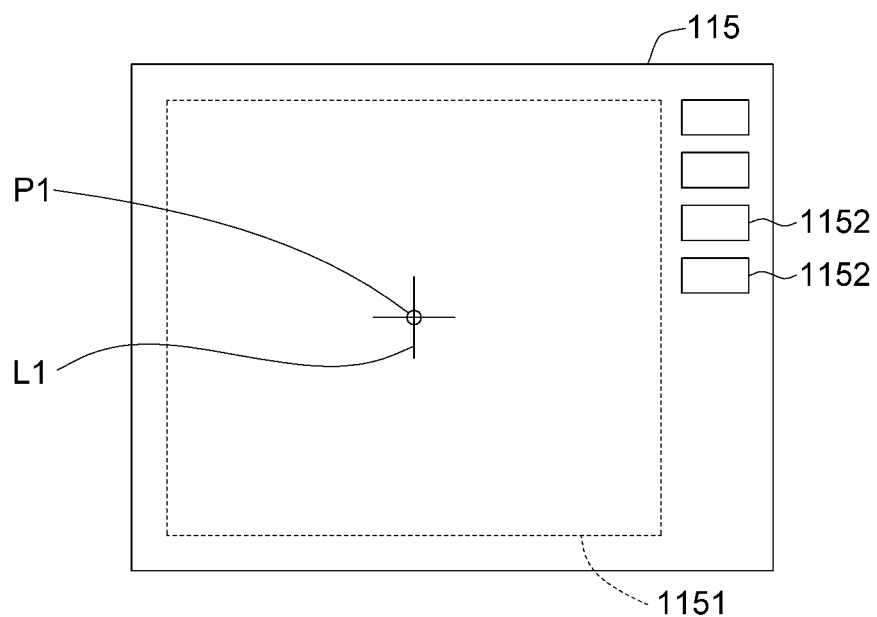
FIG. 4C shows a schematic view of the observation viewing-line of the observation device of FIG. 3C overlapping with the calibration point.

Referring to FIGS. 1A, 1B, 2, 3A to 3C and 4A to 4C, FIG. 1A shows a schematic view of a projection system 100 according to an embodiment of the present disclosure, and FIG. 1B shows a front view of an observation device 122 of FIG. 1A, FIG. 2 shows a functional block diagram of the projection system 100 of FIG. 1A, FIG. 3A shows a schematic view of an observation viewing-line L1 of the observation device 122 of FIG. 1A and a projection viewing-line L2 (or called aiming line) of a projection tube 132A, FIG. 3B shows a schematic view of the field of view seen/viewed from the calibration mirror 1321 of the projection tube 132A of FIG. 1A, FIG. 3C shows a schematic view of an observation frame (observation screen) displayed on a display area 1151 of an user interface 115 of FIG. 1A, FIG. 4A shows a schematic view of the observation viewing-line L1 of the observation device 122 and the projection viewing-line L2 of the projection tube 132A of FIG. 3A intersecting at a calibration point P1, FIG. 4B shows a schematic view of the field of view (the projection viewing-line L2) seen/viewed from the calibration mirror 1321 of the projection tube 132A of FIG. 3B overlaps with the calibration point P1, and FIG. 4C shows a schematic view of the observation viewing-line L1 of the observation device 122 of FIG. 3C overlapping with the calibration point P1.

The projection system 100 could, for example, project a projected object (not shown in FIG. 1A) to an aiming point (not shown in FIG. 1A). The projection system 100 is, for example, any machine capable of projecting the projected object, such as a game machine or a pitching machine. Depending on the application of the projection system 100, the projected object is, for example, a baseball or other various types of balls. The embodiment of the disclosure does not limit the application field of the projection system 100.

The projection system 100 includes a control module 110, an observation module 120 and an aiming module 130. The control module 110, the observation module 120 and the aiming module 130 could communicate through an Ethernet network, for example, Ethernet Control Automation Technology (EtherCAT) communication. Using the Ethernet control method, in addition to the anti-interference effect, the wiring could be significantly reduced and the volume of the overall system could be reduced.

As shown in FIG. 2, the control module 110 is configured to issue a first control command C1 and a second control command C2. The observation module 120 includes an observation driver (for example, a first observation driver 1211A and a second observation driver 1211B), an observation drive mechanism (for example, a first observation drive mechanism 1212A and a second observation drive mechanism 1212B), and an observation device 122. The observation driver is electrically connected to the observation device 122 and configured to, in response to the second control command C2, control the observation viewing-line L1 (the observation viewing-line L1 is shown in FIG. 4A) of the observation device 122 to align with the calibration point P1 (the calibration point P1 is shown in FIG. 4A). The aiming module 130 includes an aiming driver (for example, a first aiming driver 1311A and a second aiming driver 1311B), an aiming drive mechanism (for example, a first aiming drive mechanism 1312A and a second aiming drive mechanism 1312B) and a projection device 132. The projection device 132 includes the projection tube 132A. The aiming driver is electrically connected to the projection tube 132A and configured to, in response to the first control command C1, control the projection viewing-line L2 of the projection tube 132A (the projection viewing-line L2 is shown in FIG. 4A) to align with the calibration point P1. In the present embodiment, the projection tube 132A and the observation device 122 could be controlled and moved asynchronously, and accordingly it could improve the accuracy and precision of observation and aiming.

As shown in FIG. 2, the control module 110 includes a controller 111, an input/output component 112, a voltage command receiver 113, an optical signal receiver 114, a user interface 115 and an input device 116. The controller 111, the input/output component 112 and the voltage command receiver 113 communicate through an Ethernet network, for example, EtherCAT communication. Under the Ethernet architecture, the control command issued by the controller 111 is, for example, a packet, which is transmitted to all components connected to the controller 111, such as the input/output component 112 and the voltage command receiver 113.

As shown in FIG. 2, the voltage command receiver 113 is electrically connected to the input device 116 to detect the control signal (for example, voltage) of the input device 116. In an embodiment, the voltage command receiver 113 is, for example, an analog-to-digital converter (ADC). The optical signal receiver 114 is configured to receive an image signal S1 of the observation module 120. As shown in FIG. 3C, the user interface 115 is, for example, a screen (for example, a touch display screen) which provides the display area 1151 and at least one function key 1152, wherein the function key 1152 is, for example, a virtual key. After the controller 111 receives the display signal S1, the controller 111 could control the display area 1151 to display the observation frame represented by the image signal S1. The function key 1152 is configured to switch the control of the observation module 120 and/or the aiming module 130. For example, in response to the triggering of one of the function keys 1152, the controller 111 could switch the controlled object by the input device 116 to the observation module 120; in response to the triggering of another function key 1152, the controller 111 could switch the controlled object by the input device 116 to the aiming module 130.

As shown in FIG. 2, the input device 116 is configured to control the function of the observation device 122 and to control the movement of the observation device 122 and the projection tube 132A. For example, the input device 116 includes a motion control element 1161 and a function control element 1162. The motion control element 1161 is electrically connected to the voltage command receiver 113, and the function control element 1162 is electrically connected to the input/output component 112; however, such exemplification is not meant to be for limiting. The commands issued by the motion control unit 1161 and the function control unit 1162 could be output to the connected components. The motion control element 1161 is, for example, a rocker, and the function control element 1162 is, for example, a button or a lever in response to the user's operation of the motion control element 1161, and the motion control element 1161 outputs an operation command (for example, voltage change) to the voltage command receiver 113. The controller 111 receives the operation command through the voltage command receiver 113 and, in response to the operation command, sends the control command (for example, a packet) to the observation module 120 and the aiming module 130 to control the observation module 120 and/or the aiming module 130 to move. The function control component 1162 could control a laser rangefinder 1222 of the observation module 120 to perform range measurement and/or zoom in or zoom out of the image captured by the visible light camera 1221. The function control component 1162 is electrically connected to the input/output component 112. The input/output component 112 could, in response to the user's operation/triggering to the function control element 1162, send the operation command to the controller 111, and the controller 111 sends the control command to control the laser rangefinder 1222 of the observation module 120 to perform the distance measurement and/or zoom in or zoom out of the image captured by the visible light camera 1221.

As shown in FIGS. 1A and 2, the first observation driver 1211A and the second observation driver 1211B of the observation module 120 communicate through an Ethernet network, for example, EtherCAT communication. The first observation driver 1211A is connected to the first observation drive mechanism 1212A and is configured to drive the first observation drive mechanism 1212A to move, and then drives the observation device 122 to perform a gyrating movement M11 (or horizontal rotation movement), for example, to rotate around the +/−Y axis. The second observation driver 1211B is connected to the second observation drive mechanism 1212B and is configured to drive the second observation drive mechanism 1212B to move, and then drive the observation device 122 to perform a pitching movement M12, for example, to rotate around the +/−X axis.

As shown in FIGS. 1A and 1B, the observation module 120 further includes a first base 123, wherein the observation device 122 is disposed on the first base 123 to move with the first base 123. The first base 123 is connected to the first observation drive mechanism 1212A, so as to be driven by the first observation drive mechanism 1212A to drive the observation device 122 to perform the gyrating movement M11. The observation device 122 is connected to the second observation drive mechanism 1212B to be driven by the second observation drive mechanism 1212B to perform the pitching movement M12.

As shown in FIGS. 1A and 1B, the observation device 122 includes the visible light camera 1221, the laser rangefinder 1222 and an infrared camera 1223. The relative relationship among the visible light camera 1221, the rangefinder 1222 and the infrared camera 1223 is fixed, so that the first observation drive mechanism 1212A and/or the second observation drive mechanism 1212B drive the visible light camera 1221, the laser rangefinder 1222 and the infrared camera 1223 of the observation device 122 to perform the gyration movement M11 and/or the pitching movement M12 synchronously.

Figure 6A:
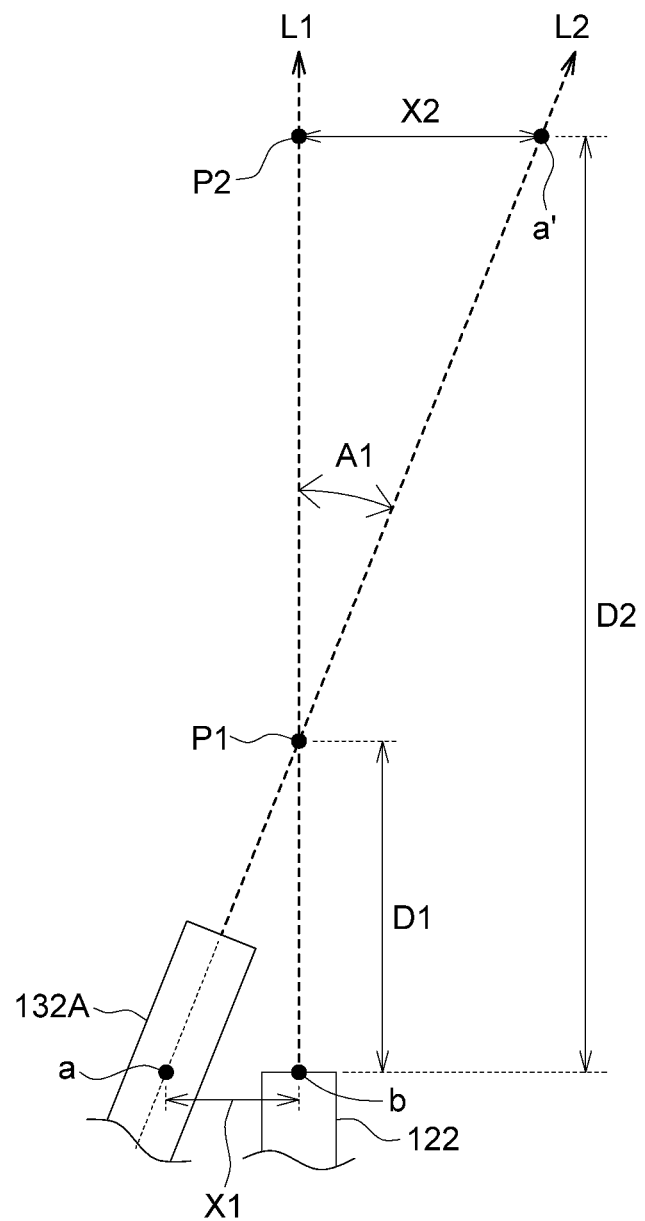
FIG. 6A shows a schematic view of the projection viewing-line of the projection tube and the observation viewing-line of the observation device of FIG. 4A not intersecting at the target point.

As shown in FIG. 2, the visible light camera 1221 is electrically connected to the optical signal receiver 114. The image signal S1 captured by the visible light camera 1221 is transmitted to the optical signal receiver 114. The laser rangefinder 1222 is configured to emit laser light to detect a calibration distance D1 (the calibration distance D1 is shown in FIG. 4A) between the laser rangefinder 1222 (or the observation device 122) and the calibration point P1 (calibration point P1 is shown in FIG. 4A) and a target distance D2 (the target distance D2 is shown in FIG. 6A) between the laser rangefinder 1222 (or the observation device 122) and the target point P2 (the target point P2 is shown in FIG. 6A). The infrared camera 1223 is electrically connected to the optical signal receiver 114, and the infrared camera 1223 is suitable for night photography.

As shown in FIGS. 1A and 2, the first aiming driver 1311A, the second aiming driver 1311B and the propulsion driver 1311C of the aiming module 130 communicate through Ethernet network, for example, EtherCAT communication. The first aiming driver 1311A is connected to the first aiming drive mechanism 1312A and configured to drive the first aiming drive mechanism 1312A to move, thereby driving the projection device 132 to perform the gyrating movement M21, for example, to rotate around the +/−Y axis. The second aiming driver 1311B is connected to the second aiming drive mechanism 1312B and is configured to drive the second aiming drive mechanism 1312B to move, thereby driving the projection device 132 to perform the pitching movement M22, for example, to rotate around the +/−X axis.

As shown in FIG. 1A, the projection device 132 further includes a propulsion mechanism 132B and a second base 132C, wherein the projection tube 132A is disposed on the second base 132C to move with the second base 132C. The second base 132C is connected to the first aiming drive mechanism 1312A, and is driven by the first aiming drive mechanism 1312A to drive the projection tube 132A and the propulsion mechanism 132B to perform the gyrating movement M21. The projection tube 132A is connected to the second aiming drive mechanism 1312B to be driven by the second aiming drive mechanism 1312B to perform the pitching movement M22. The propulsion mechanism 132B is connected to the projection tube 132A to load at least one projected object (not shown) in/to the projection tube 132A. The propulsion mechanism 132B is controlled by the propulsion driver 1311C. The propulsion driver 1311C could control the propulsion mechanism 132B to fill the projection tube 132A with at least one projected objects.

In summary, as shown in FIG. 2, the controller 111, the input/output component 112, the voltage command receiver 113, the first observation driver 1211A, the second observation driver 1211B, the first aiming driver 1311A, the second aiming driver 1311B and the propulsion driver 1311C could communicate via Ethernet. The controller 111 sends, in response to the operation command from the input device 116, the control command (for example, packet) to transmit (for example, broadcast) to all connected drivers. When the driver receives the control command, at least one driver related to the control command controls the movement of the connected mechanism according to the control command, and/or at least one driver not related to the control command could ignore the control command. In addition, the aforementioned driving mechanism includes, for example, a motor, at least one gear or gear set, a driving belt (such as a chain, a pulley, etc.), and/or other driving elements, as long as a mechanism is capable of driving the connected components to perform the gyrating movement and/or the pitching movement, it could be used as a component of the driving mechanism referred to in the embodiment of this disclosure. In addition, at least one of the controller 111, the input/output component 112, the voltage command receiver 113, the optical signal receiver 114, the first observation driver 1211A, the second observation driver 1211B, the first aiming driver 1311A, the second aiming driver 1311B and the propulsion driver 1311C could be a physical circuit formed by, for example, at least one semiconductor process.

The following describes the process of a projection calibration method of the projection system 100.

Figure 5:
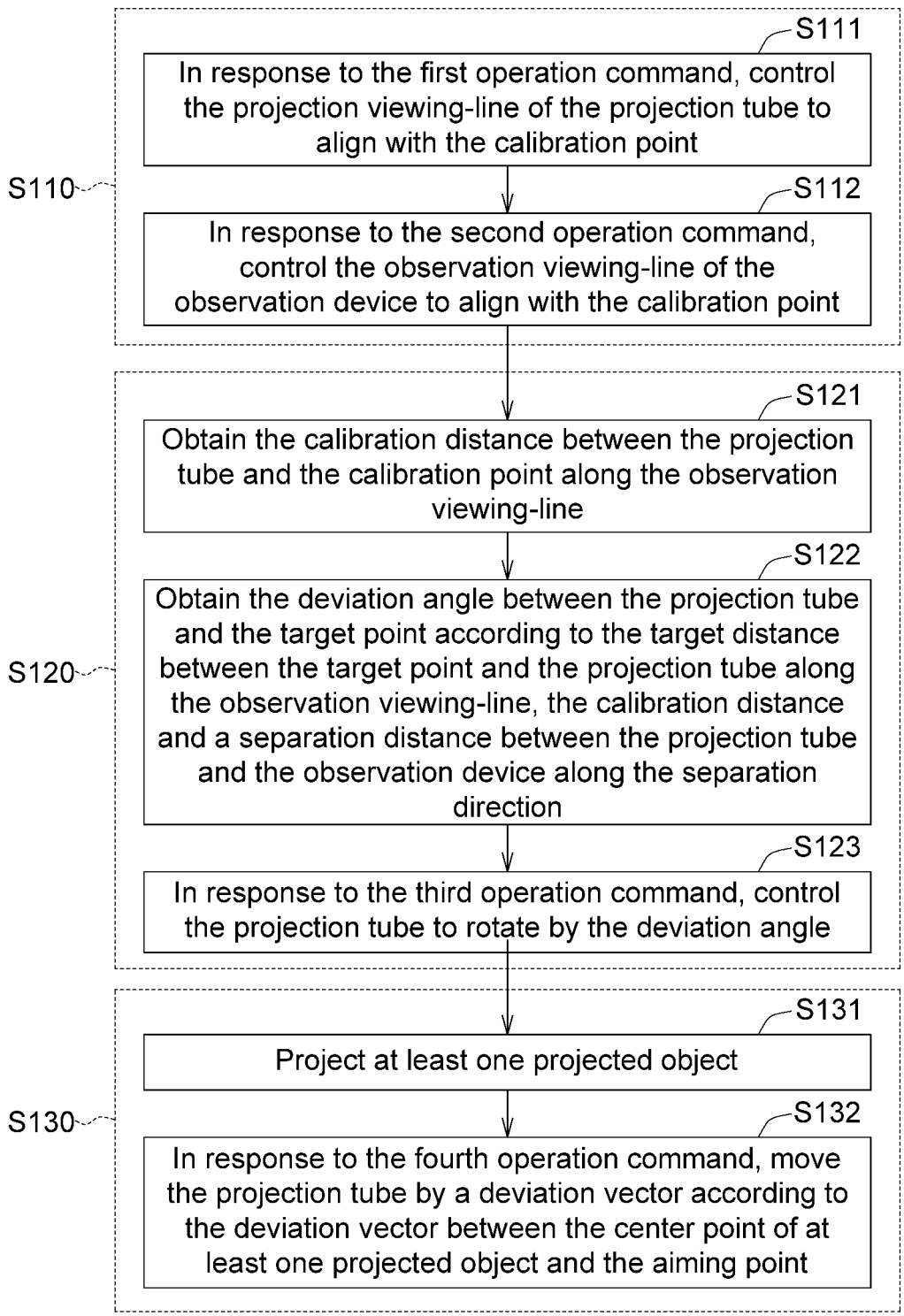
FIG. 5 shows a flowchart of the projection calibration method according to an embodiment of the present disclosure.

Referring to FIG. 5, FIG. 5 shows a flowchart of the projection calibration method according to an embodiment of the present disclosure. In the present embodiment, the projection calibration method could include a concentric calibration (step S110), a target point aiming calibration (step S120), and a return-to-zero calibration (step S130), which will be explained one by one below.

In step S110, the projection system 100 performs a concentric calibration step. Concentric calibration could eliminate mechanical errors between the observation module 120 and the aiming module 130, such as errors caused by mechanical manufacturing tolerances and mechanical assembly tolerances. In an embodiment, the concentric calibration step S110 includes steps S111 and S112; however, such exemplification is not meant to be for limiting.

In step S111, as shown in FIGS. 2 and 4A, in response to the first operation command T1, the aiming driver (the first aiming driver 1311A and/or the second aiming driver 1311B) controls the projection viewing-line L2 of the projection device 132 to align with the calibration point P1. Furthermore, as shown in FIGS. 3A and 3B, the projection viewing-line L2 of the projection tube 132A is not aligned with the calibration point P1. As shown in FIG. 2, the input device 116 outputs, in response to the user's operating, a first operation command T1. The controller 111 sends, in response to the first operation command T1, a first control command C1 (for example, packet) to the first aiming driver 1311A and/or the second aiming driver 1311B, so as to control the first aiming drive mechanism 1312A to perform the gyrating movement M21 (the gyrating movement M21 is shown in FIG. 1A) and/or the second aiming drive mechanism 1312B is controlled to perform the pitching movement M22 (the pitching movement M22 is shown in FIG. 1A) until the projection viewing-line L2 of the projection tube 132A is aligned with the calibration point P1, as shown in FIGS. 4A and 4B.

As shown in FIGS. 3B, the calibration mirror 1321 could be disposed on the projection tube 132A, and a center of the calibration mirror 1321 (a cross as shown in FIG. 3B) is aligned with the center of the projection tube 132A (projection viewing-line L2). The center of the calibration mirror 1321 is substantially coincident with the projection viewing-line L2 of the projection tube 132A. By observing the correction mirror 1321, relative position between the projection viewing-line L2 of the projection tube 132A and the calibration point P1 could be known or obtained.

In step S112, as shown in FIGS. 2 and 4A, in response to the second operation command T2, the observation driver (the first observation driver 1211A and/or the second observation driver 1211B) controls the observation viewing-line L1 of the observation device 122 to align with the calibration point P1. For example, as shown in FIGS. 3A and 3C, the observation viewing-line L1 of the visible light camera 1221 of the observation device 122 is not aligned with the calibration point P1. As shown in FIG. 2, the input device 116 outputs, in response to the user's operating, a second operation command T2. In response to the second operation command T2, the control module 110 sends a second control command C2 (for example, packet) to the first observation driver 1211A and/or the second observation driver 1211B to control the first observation drive mechanism 1212A to perform the gyrating motion M11 (the gyrating movement M11 is shown in FIG. 1A) and/or the second observation drive mechanism 1212B is controlled to perform the pitching movement M12 (the pitching movement M12 is shown in FIG. 1A) until the observation viewing-line L1 of the visible light camera 1221 is aligned with the calibration point P1, as shown in FIGS. 4A and 4C.

After completing the concentric calibration step, the observation viewing-line L1 of the visible light camera 1221 and the projection viewing-line L2 of the projection tube 132A intersect at the calibration point P1, as shown in FIG. 4A. In addition, as described above, step S111 and step S112 could be performed asynchronously (that is, independently controlled), and it could improve the accuracy and precision of concentric calibration, speed up the calibration process and/or saving calibration time.

Then, the projection system 100 could perform the target point aiming calibration step S120. The target point aiming calibration step could ensure the aiming consistency of the observation module 120 and the aiming module 130 at each target distance. Step S120 could include steps S121 to S123.

Figure 6B:
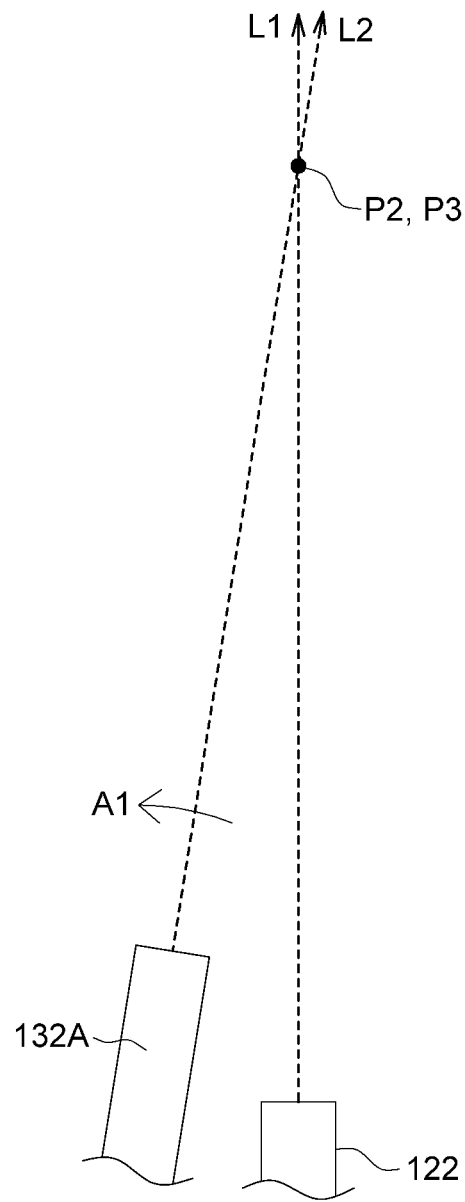
FIG. 6B shows a schematic view of the projection viewing-line of the projection tube and the observation viewing-line of the observation device of FIG. 6A intersecting at the target point.

Referring to FIGS. 6A and 6B, FIG. 6A shows a schematic view of the projection viewing-line L2 of the projection tube 132A and the observation viewing-line L1 of the observation device 122 of FIG. 4A not intersecting at the target point P2, and FIG. 6B shows a schematic view of the projection viewing-line L2 of the projection tube 132A and the observation viewing-line L1 of the observation device 122 of FIG. 6A intersecting at the target point P2.

In step S121, the calibration distance D1 (the calibration distance D1 is shown in FIG. 6A) between the projection tube 132A and the calibration point P1 along the observation viewing-line is obtained. In an embodiment, the position of the calibration point P1 could be determined first, and then the laser rangefinder 1222 detects the calibration distance D1 between the projection tube 132A and the calibration point P1 along the observation viewing-line L1. In another embodiment, the calibration distance D1 could be determined first, then the laser rangefinder 1222 calibrates or marks an end position of the calibration distance D1, and then the calibration point P1 could be disposed at the end position of the calibration distance D1. In addition, the calibration point P1 is, for example, an observable physical object.

In step S122, as shown in FIGS. 2 and 6A, the controller 111 could obtain a deviation angle A1 between the projection tube 132A (projection device 132) and the target point P2 according to (or by calculating) the target distance D2 between the target point P2 and the projection tube 132A along the observation viewing-line L1, the calibration distance D1 and a separation distance x1 between the projection device 132 and the observation device 122 along the separation direction X (the separation distance x1 is shown in FIG. 1B).

In an embodiment, the position of the target point P2 could be determined first, and then the laser rangefinder 1222 detects the target distance D2 along the observation viewing-line L1 between the projection tube 132A and the target point P2. In another implementation, the target distance D2 could be determined first, and then the laser rangefinder 1222 calibrates or marks the end position of the target distance D2, and then the target point P2 could be disposed at the end position of the target distance D2. In addition, the target point P2 is, for example, an observable physical object.

As shown in FIG. 6A, the separation distance x1 and the calibration distance D1 form a triangle a-b-P1, and the difference (that is, D2−D1) between the target distance D2 and the calibration distance D1 and the deviation distance x2 form a triangle a'-P2-P1, wherein the triangle a-b-P1 is similar to triangle a'-P2-P1. These two similar triangles have the size relationship of the following formula (1). The controller 111 could obtain the deviation distance x2 according to the following formula (1), and obtain the deviation angle A1 according to the following formula (2).

$$x2 = \frac{(D2 - D1)}{D1} \times x1 \quad (1)$$

$$A1 = \tan^{-1}\left(\frac{x2}{D1 + (D2 - D1)}\right) \quad (2)$$

In step S123, as shown in FIGS. 2 and 6B, in response to the third operation command T3, the first observation driver 1211A controls the projection viewing-line L2 of the projection tube 132A to rotate by the deviation angle A1. For example, as shown in FIG. 2, the input device 116 outputs, in response to the user's operating, a third operation command T3. In response to the third operation command T3, the controller 111 sends a third control command C3 (for example, packet) to the first aiming driver 1311A to control the first aiming drive mechanism 1312A to perform the gyrating movement M21 (the gyrating movement M21 is shown in FIG. 1A) until the projection viewing-line L2 of the projection tube 132A is aligned with the target point P2, as shown in FIG. 6B.

After completing the target point aiming calibration step, the observation viewing-line L1 of the visible light camera 1221 and the projection viewing-line L2 of the projection tube 132A intersect at the target point P2, as shown in FIG. 6B. As described above, after the concentric calibration step S110 is completed, the projection system 100 could use the above formulas (1) and (2) to aim at the target point P2 at different target distance D2, without performing the concentric calibration step on the target point P2. In addition, the target point P2 of FIG. 6B could be used as the aiming point P3 to perform the return-to-zero calibration step of the actual aiming projection.

In step S130, the projection system 100 could perform the return-to-zero calibration step. The return-to-zero calibration step could eliminate errors caused by the aiming module 130 to the overall projection system 100 under various environmental factors, such as wind speed, wind direction, climate or other environmental factors that could affect the accuracy and precision of the projection. Step S130 could include steps S131 to S132; however, such exemplification is not meant to be for limiting.

Figure 7A:
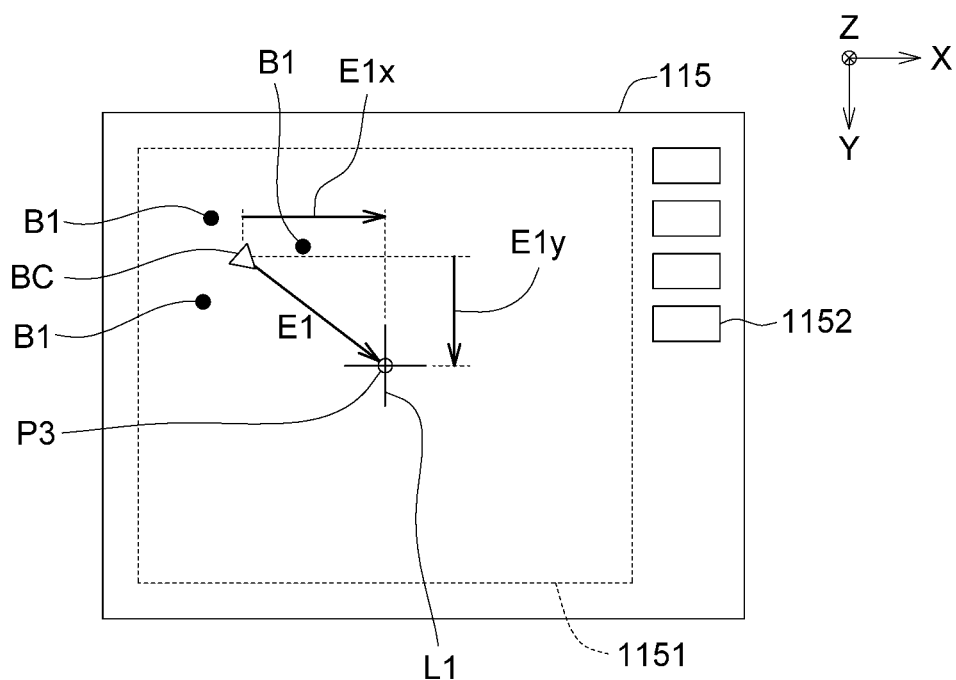
FIG. 7A shows a schematic view of the user interface of FIG. 1A showing a deviation vector of several projected objects and the aiming point.
Figure 7B:
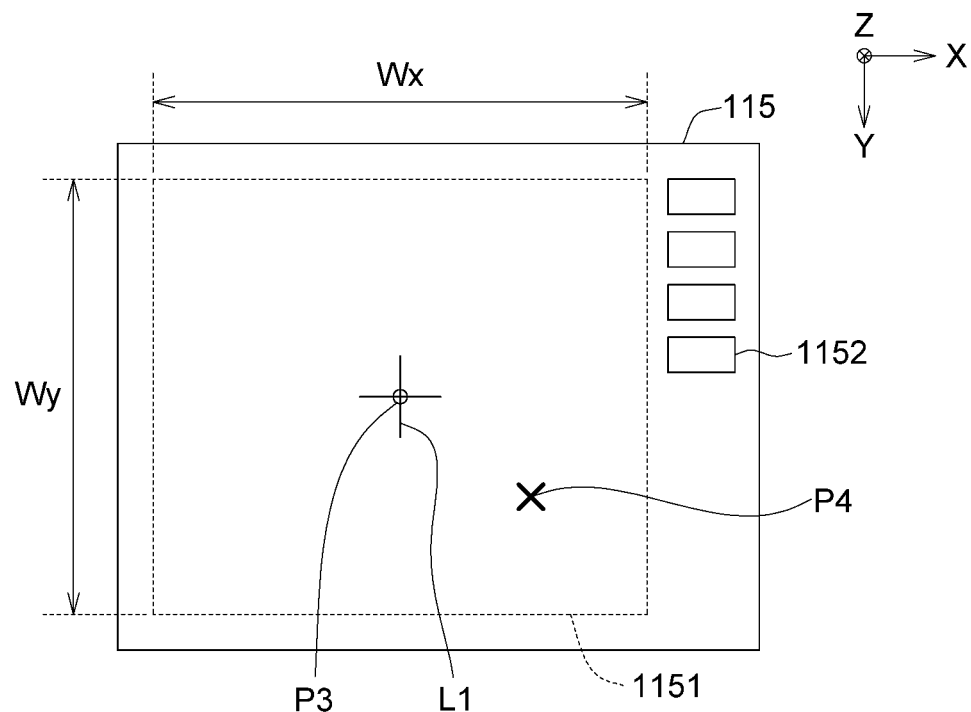
FIG. 7B shows a schematic view of relative relationship between a calibrated aiming point and the aiming point of FIG. 7A.
Figure 7C:
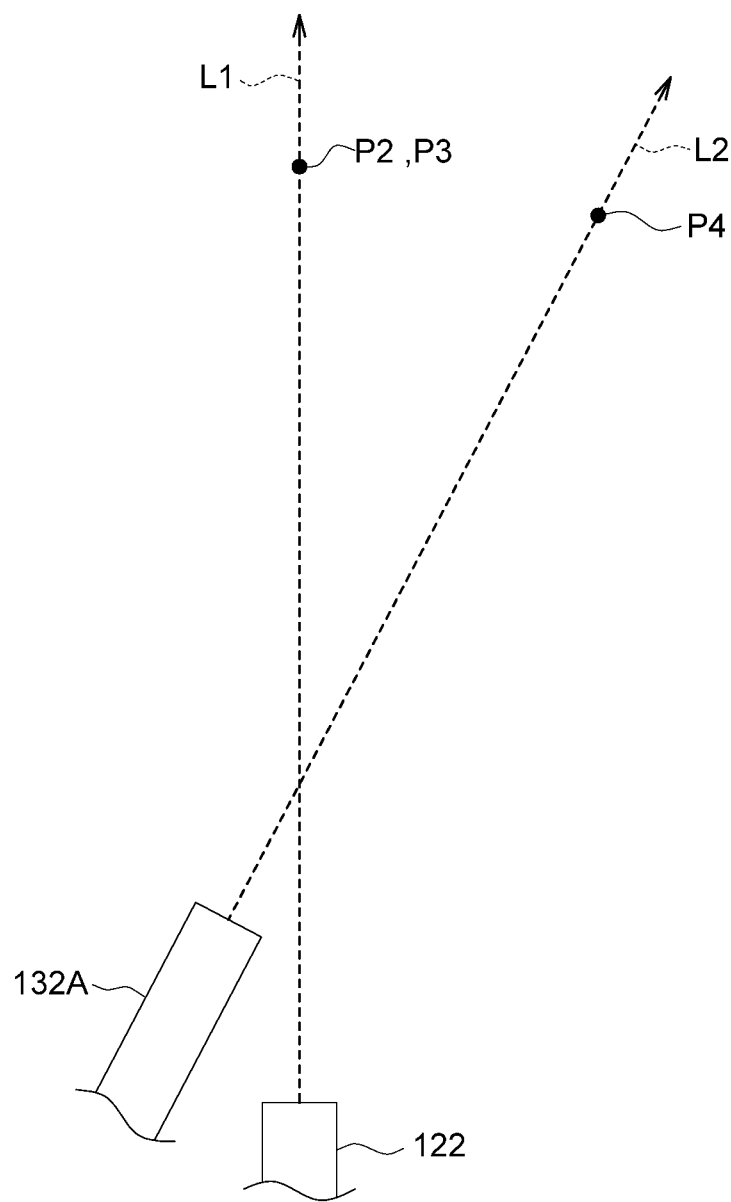
FIG. 7C shows a schematic view of the projection viewing-line of the projection tube of FIG. 6B moving to the calibrated aiming point.

Referring to FIGS. 7A to 7C, FIG. 7A shows a schematic view of the user interface 115 of FIG. 1A showing a deviation vector of several projected objects B1 and the aiming point P3, FIG. 7B shows a schematic view of relative relationship between a calibrated aiming point P4 and the aiming point P3 of FIG. 7A, and FIG. 7C shows a schematic view of the projection viewing-line L2 of the projection tube 132A of FIG. 6B moving to the calibrated aiming point P4.

In step S131, as shown in FIGS. 2 and 7A, in response to a projection operating command (not shown), the projection tube 132A projects at least one projected object B1. For example, the input device 116 outputs, in response to the user's operating, a projection operation command (not shown). The controller 111 sends, in response to the projection operating command, a projection control command (not shown) (for example, packet) to the propulsion driver 1311C to control the propulsion driver 1311C to load the projection tube 132A with the projected object B1, and project the projected object B1 toward the aiming point P3. However, due to the influence of various environmental factors, the several projected objects B1 do not fall at the aiming point P3 (the intersection of the observation viewing-line L1 and the projection viewing-line L2), and thus there is the deviation vector $\overline{E1}$ ($E1_x$,$E1_y$) between the center point BC of the several projected objects B1 and the aiming point P3. The controller 111 could analyze, by using image analysis technology, the observation frame (as shown in FIG. 7A) displayed on the display area 1151 to obtain an horizontal deviation pixel amount (points) $E1_x$ of the deviation vector $\overline{E1}$ ($E1_x$,$E1_y$) along a horizontal direction and a vertical deviation pixel amount (points) $E1_y$ of the deviation vector $\overline{E1}$ ($E1_x$,$E1_y$) along a vertical direction.

In step S132, as shown in FIGS. 2 and 7C, in response to the fourth operation command T4, the projection tube 132A moves to the calibrated aiming point P4 according to the deviation vector $\overline{E1}$ ($E1_x$,$E1_y$) (as shown in FIG. 7A) between the center point BC and the aiming point P3. For example, the input device 116 sends, in response to the user's operating, a fourth operation command T4. In response to the fourth operation command T4, the controller 111 sends a fourth control command C4 (for example, packet) to the aiming driver (the first aiming driver 1311A and/or the second aiming driver 1311B) and/or the observation driver (the first observation driver 1211A and/or the second observation driver 1211B) to control the observation device 122 and/or the projection tube 132A to perform the gyration movement and/or the pitch movement, so that the observation viewing-line L1 of the observation device 122 passes through or is aligned with the aiming point P3 and the projection viewing-line L2 of the projection tube 132A passes or is aligned with the calibrated aiming point P4. In the present embodiment, the projection tube 132A could perform the gyrating movement and/or the pitching movement to move the projection viewing-line L2 to the calibrated aiming point P4, and the observation device 122 could remain stationary, so that the observation viewing-line L1 could maintain aligning with or passing through the aiming point P3. In terms of control, the observation viewing-line L1 of the observation device 122 and the projection viewing-line L2 of the projection tube 132A could be controlled to move asynchronously. As long as the projection viewing-line L2 of the projection tube 132A is corrected/moved to the calibrated aiming point P4, the embodiment of the disclosure does not limit the movement mode of the observation module 120 and/or the aiming module 130, such as the movement direction and/or the amount of movement.

In addition, the controller 111 could obtain a gyrating rotation angle $\emptyset_x$ and a pitching rotation angle $\emptyset_y$ according to the following formulas (3) and (4). In formulas (3) and (4), $\emptyset_x$ is the gyrating rotation angle of the projection tube 132A, and $\emptyset_y$ is the pitching rotation angle of the projection tube 132A, $FOV_x$ is the horizontal observation angle (degrees) of the observation device 122, $FOV_y$ is the vertical observation angle (degrees) of the observation device 122, $W_x$ is the horizontal (e.g., along the X direction) pixel amount of the observation frame of the observation device 122, and $W_y$ is the vertical (e.g., along the Y direction) pixel amount of the observation frame of the observation device 122. After obtaining the gyrating rotation angle $\emptyset_x$ and the pitching rotation angle $\emptyset_y$, the controller 111 could control the projection tube 132A to rotate by the gyrating rotation angle $\emptyset_x$ in the horizontal direction and rotate by the pitching rotation angle $\emptyset_y$ in the vertical direction to move the projection viewing-line L2 of the projection tube 132A to aim at the calibrated aiming point P4 after correction.

$$\emptyset_x = FOV_x \times \frac{E1_x}{W_x} \quad (3)$$

$$\emptyset_y = FOV_y \times \frac{E1_y}{W_y} \quad (4)$$

As shown in FIG. 7A, the observation frame displayed on the display area 1151 of the user interface 115 represents the observation field of the observation device 122, wherein the observation field has related parameters, such as the horizontal observation angle $FOV_x$, the vertical observation angle $FOV_y$, the horizontal observation pixel amount $W_x$ and the vertical observation pixel amount $W_y$, etc., wherein the horizontal observation angle $FOV_x$ corresponds to the horizontal observation pixel amount $W_x$, and the vertical observation angle $FOV_y$ corresponds to the vertical observation pixel amount $W_y$. The observation angle is proportional to the observation pixel amount, and the ratio of the horizontal observation angle $FOV_x$ to the vertical observation angle $FOV_y$ is equal to the ratio of the horizontal observation pixel amount $W_x$ and the vertical observation pixel amount $W_y$. Taking the horizontal observation pixel amount $W_x$ being 640 dots and the vertical observation pixel amount $W_y$ being 480 dots as example, the horizontal observation angle $FOV_x$ is 2.4 degrees and the vertical observation angle $FOV_y$ is 1.8 degrees.

In an embodiment, in case of the horizontal observation angle $FOV_x$ being 2.4 degrees, the vertical observation angle $FOV_y$ being 1.8 degrees, the horizontal observation pixel amount $W_x$ being 640, the vertical observation pixel amount $W_y$ being 480, the horizontal deviation pixel amount $E1_x$ being 100 and the vertical deviation pixel amount $E1_y$ being −120, the controller 111 obtains the gyrating rotation angle $Ø_x$ is 0.375 degrees and the pitching rotation angle $Ø_y$ is −0.45 degrees according to the above formulas (3) and (4). Accordingly, the controller 111 controls the aiming point P3 to rotate by 0.375 degrees in the horizontal direction and rotate by −0.45 degrees in the vertical direction, so that the projection viewing-line L2 of the projection tube 132A could move to the calibrated aiming point P4.

Then, the projection tube 132A projects the projected object B1 toward the calibrated aiming point P4, so that the projected object B1 could approach or even hit the target point P2.

In summary, the projection system of the embodiment of the present disclosure includes an aiming module and an observation module. The aiming module and the observing module are, for example, non-synchronized controlled, and accordingly it could accurately and precisely observe and aim. In an embodiment, the modules of the projection system (for example, the control module, the aiming module and the observation module) use Ethernet (for example, EtherCAT) to communicate. In addition to the anti-interference effect, it could greatly reduce wiring and/or reduce the overall system volume.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A projection calibration method, comprising:
   In response to a first control command, controlling, by an aiming driver, a projection viewing-line of a projection tube to be aligned with a calibration point; and
   In response to a second control command, controlling, by an observation driver, an observation viewing-line of an observation device to be aligned with the calibration point;
   wherein controlling the projection viewing-line of the projection tube to be aligned with the calibration point and controlling the observation viewing-line of the observation device to be aligned with the calibration point are performed asynchronously;
   wherein before controlling the projection viewing-line of the projection tube to be aligned with the calibration point, the projection calibration method further comprises:
   obtaining a calibration distance between the projection tube and the calibration point along the observation viewing-line; and
   according to a target distance between a target point and the projection tube along the observation viewing-line, the calibration distance and a separation distance between the projection tube and the observation device along a separation direction, obtaining a deviation angle between the projection tube and the target point.

2. The projection calibration method according to claim 1, wherein the aiming driver and the observation driver communicate through an Ethernet network.

3. The projection calibration method according to claim 1, wherein the first control command and the second control command are packets.

4. The projection calibration method according to claim 1, wherein the deviation angle is obtained according to the following formulas (1) and (2):

$$x2 = \frac{(D2 - D1)}{D1} \times x1; \quad (1)$$

and $$A1 = \tan^{-1}\left(\frac{x2}{D1 + (D2 - D1)}\right) \quad (2)$$

wherein x1 represents the separation distance, x2 represents a deviation distance between the target point and the projection viewing-line, D1 represents the calibration distance, D2 represents the target distance, and A1 represents the deviation angle.

5. The projection calibration method according to claim 1, further comprises:
   in response to a third control command, controlling, by the aiming driver, the projection tube to rotate by the deviation angle.

6. The projection calibration method according to claim 1, further comprises:
   in response to a third control command, controlling, by the aiming driver, the projection tube so that the observation viewing-line of the observation device and the projection viewing-line of the projection tube intersect at an aiming point;
   projecting, by the projection tube, at least one projected object; and
   the projection tube moving according to a deviation vector between a center point of the at least one projected object and the aiming point.

7. The projection calibration method according to claim 6, wherein a direction of the deviation vector is toward the aiming point from the center point.

8. The projection calibration method according to claim 6, wherein the projection tube moving according to the deviation vector comprises:
   the projection tube rotating by a gyrating rotation angle $Ø_x$ and/or a pitching rotation angle $Ø_y$;
   wherein the gyrating rotation angle $Ø_x$ and the pitching rotation angle $Ø_y$ are obtained according to the following formulas (3) and (4):

$$Ø_x = FOV_x \times \frac{E1_x}{W_x}; \quad (3)$$

$$Ø_y = FOV_y \times \frac{E1_y}{W_y}; \quad (4)$$

wherein $FOV_x$ represents a horizontal observation angle of the observation device, $FOV_y$ represents a vertical observation angle of the observation device, $W_x$ represents a horizontal observation pixel amount of an observation frame captured by the observation device, and $W_y$ represents an vertical observation pixel amount of the observation frame captured by the observation device, $E1_x$ represents a horizontal deviation pixel amount of the deviation vector in a horizontal direction, and $E1_y$ represents a vertical deviation pixel amount of the deviation vector in an vertical direction.

\* \* \* \* \*